United States Patent [19]

Welsh

[11] 3,774,543

[45] Nov. 27, 1973

[54] PASSENGER VEHICLE STATIC SWITCHING APPARATUS

[75] Inventor: Patrick George Welsh, Chicago, Ill.

[73] Assignee: Pullman Incorporated, Chicago, Ill.

[22] Filed: Dec. 8, 1971

[21] Appl. No.: 206,003

[52] U.S. Cl.................. 104/130, 246/427, 104/1 A
[51] Int. Cl............................................ E01b 25/12
[58] Field of Search..................... 104/96, 105, 134, 104/139, 1 A; 105/141; 246/427

[56] References Cited
UNITED STATES PATENTS

| 3,650,216 | 3/1972 | Broome | 104/130 X |
| 336,050 | 2/1886 | Jacobs | 104/1 A |
| 3,403,634 | 10/1968 | Crowder | 104/88 |
| 3,593,668 | 7/1971 | Adams | 104/130 |

Primary Examiner—Robert G. Sheridan
Assistant Examiner—D. W. Keen
Attorney—Hilmond O. Vogel et al.

[57] ABSTRACT

A device for switching a passenger vehicle riding on rails between two track sections wherein only stationary track portions are involved. A double rim wheel is used in the vehicle and combines with a truck mounted guide rail engaging device to switch passenger vehicle from a first to a second track portion. Guide rails are mounted adjacent and above each supporting track member and engageable by the truck mounted guiding device to automatically urge the vehicle along a selectable track portion.

7 Claims, 6 Drawing Figures

PATENTED NOV 27 1973 3,774,543
SHEET 1 OF 2
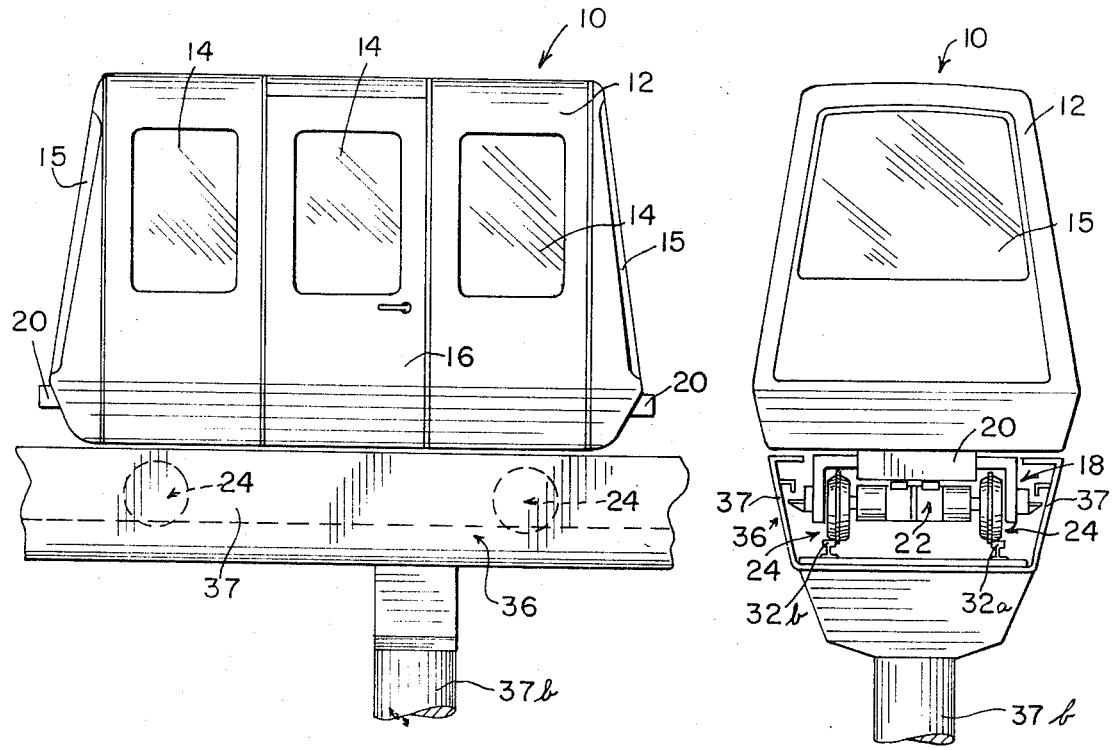
FIG_1_
FIG_2_
FIG_3_
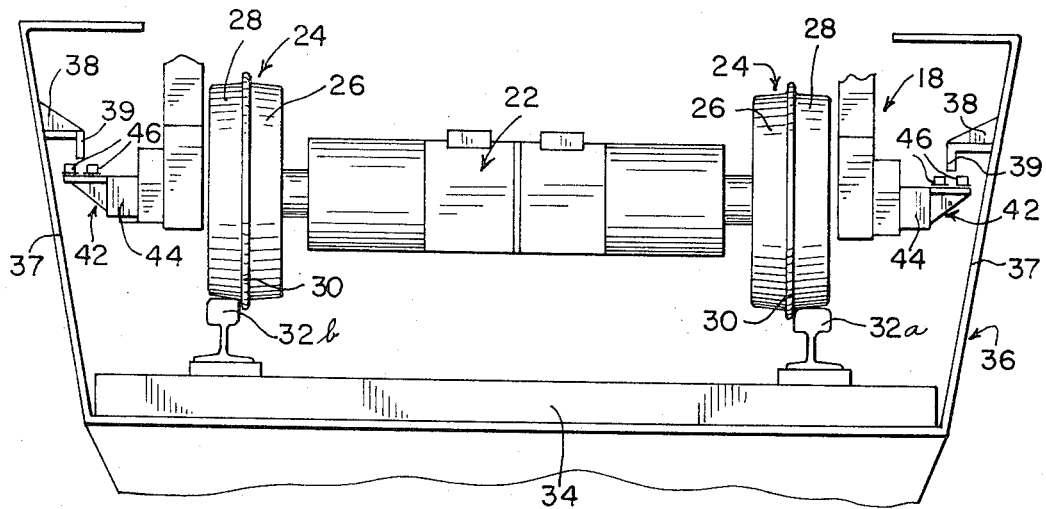

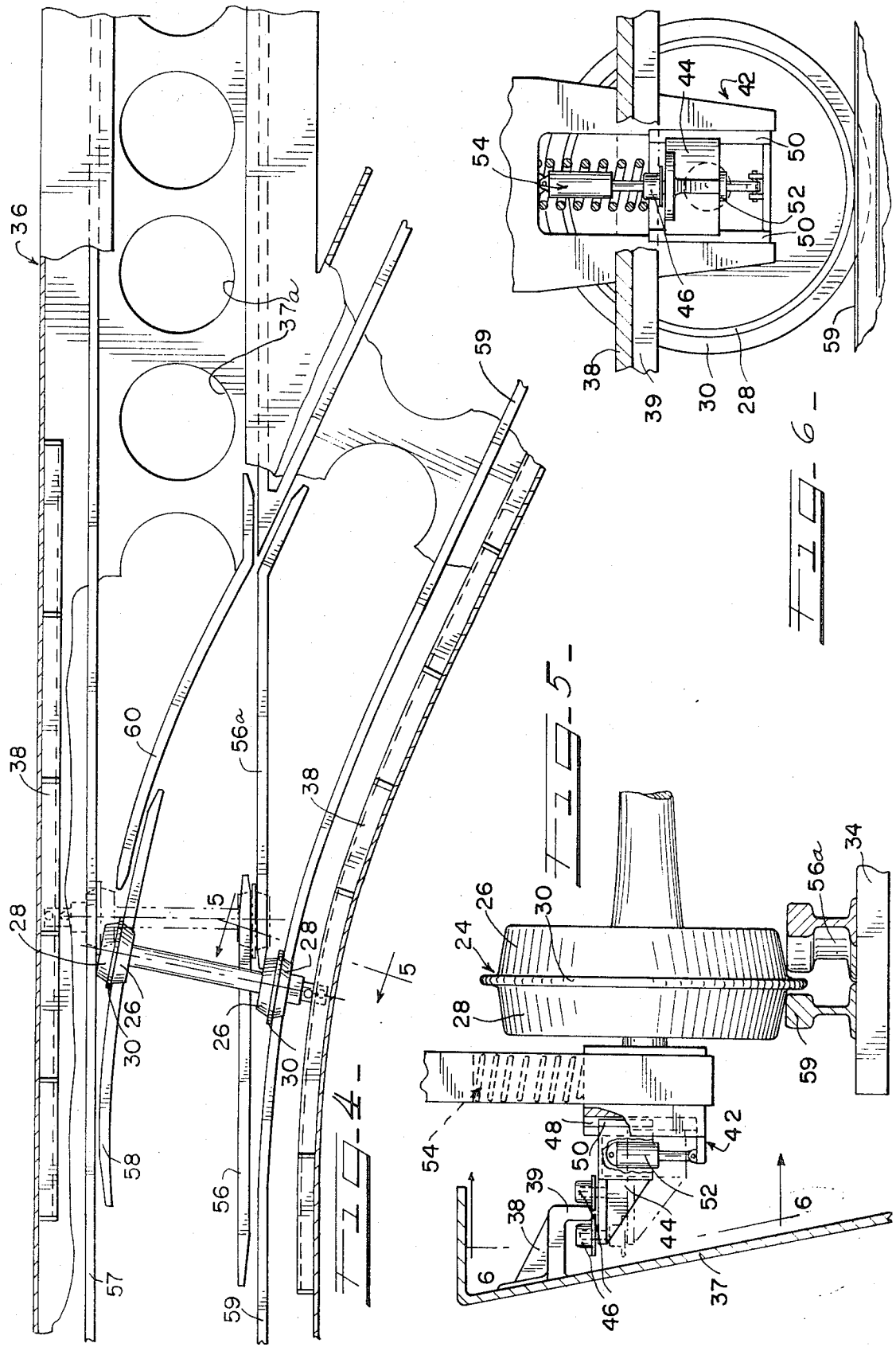

PASSENGER VEHICLE STATIC SWITCHING APPARATUS

BACKGROUND OF THE INVENTION

1. Field of the Invention

This invention pertains to railway vehicles and in particular their supporting track structures and apparatus for switching the vehicle between different track sections.

2. Description of the Prior Art

Prior art of so-called static switching arrangements wherein no movable switch components were involved with the track members have generally received little commercial acceptance because of their use with a single rim conventional railway wheel which resulted in the wheel running on the flange for a portion of the switching due to the non-continuous switch track to main track junction. The present invention provides a railway vehicle riding on supporting wheel members having double tread portions which provide constant wheel and rail contact for a wide area and also has eliminated the necessity for thin supporting track leadin portions which could fail under heavy loads.

SUMMARY

The present invention pertains to a railway vehicle switching apparatus wherein stationary track members are utilized in combination with a car mounted guide means which is engageable with guide rail members positioned adjacent the track members. In operation, the truck mounted guide means are actuated manually by a conductor or by automatic means to engage the trackside mounted guide rail means to urge the vehicle from a main supporting track to a second track member to thereby perform a switching function at a point where a track divides from a single to a double track. Double tread wheel members supporting the car permit utilization of fixedly mounted track members and insure that adequate and continuous support is provided for the vehicle during the switching operation.

It is an object of the present invention to provide a railway vehicle switching arrangement employing fixedly mounted track members and a vehicle truck mounted guide means associated with trackside mounted guide rail portions which are engageable to switch the vehicle.

It is another object of the present invention to provide a railway vehicle wherein a double tread wheel is used to support the vehicle body and facilitate the switching operation by providing a desirable wheel to rail contact area during the entire switching operation.

These and other objects of the invention will become apparent from reference to the following description, appended claims and attached drawings.

DESCRIPTION OF THE DRAWINGS

FIG. 1 is a side elevational view of the railway vehicle involved with the present invention;

FIG. 2 is an end view of the apparatus illustrated in FIG. 1;

FIG. 3 is an enlarged view of the supporting truck arrangement;

FIG. 4 is a top plan view of the stationary track structure involved with the present invention;

FIG. 5 is a sectional view taken along line 5—5 of FIG. 4 with portions removed; and FIG. 6 is a sectional view taken along line 6—6 of FIG. 5.

DESCRIPTION OF THE INVENTION

FIG. 1 indicates the type of passenger vehicle contemplated for use with the present design and is generally indicated by the numeral 10 and includes a body portion 12 having side windows 14 and end windows 15. A centrally disposed door 16 permits passage to and from the vehicle. The vehicle body 12 which includes the reinforcing supporting underframe is supported by the spaced truck members 18 and includes coupler or bumper units 20 positioned at the end of the vehicle. A motive power traction unit 22 is indicated schematically in the trucks 18 and supplies drive power to the wheels 24.

The wheels 24 are of a double tread or double rim construction including inner rim 26 and an outer rim 28 spaced about a centrally disposed flange portion 30 which guides the vehicle and restricts lateral movement thereof. As illustrated in FIGS. 2 and 3 the outer rims of the wheels 26 are supported on rail members 32a, 32b. The rails are supported on the usual cross tie members 34 which may be of the conventional wood or precast concrete construction. The tracks are completely surrounded on three sides and partially surrounded on a fourth side by the noise suppressant housing 36 which includes generally vertically extending sides 37 which extend above the truck area to prevent noise from escaping laterally outwardly of the trucks. The bottom of the noise suppressant housing 36 includes a plurality of openings 37a which are intended to remove excess weight from the supporting structure. It is contemplated that a noise absorbing material would be positioned on the interior of the housing 36 to reduce noise. The entire trackway may be supported above the ground level by a series of pillars such as 37b illustrated in FIGS. 1 and 2.

As best illustrated in FIG. 5 it is noticed that the sides 37 of the noise suppressant housing 36 have guide rails 38 fixedly attached thereto. These guide rails include downwardly extending depending finger portions 39 which are engaged by the vehicle guiding devices 42 which are mounted on the vehicle trucks 18.

These guide rail engaging devices or steering members 42 include a vertically movable guide rail engaging portion 44 having a pair of rail engaging roller members 46 which permit the rail engaging device and the vehicle to move smoothly along the guide rail 38. The vertically movable portion 44 is positioned in slots 48 which receive guide portions 50 of the vertically movable portions 44 to allow vertical movement for engagement of the rail engaging device 42 with an associated guide rail. As illustrated in FIGS. 5 and 6, the guide rail engaging portion 42 is vertically movable in response to operation of a hydraulic cylinder 52 which is fixedly attached to the truck 18. Although a hydraulic cylinder is suggested, a pneumatic cylinder or electromechanical device could perform the same function of raising and lowering the guide rail engaging device 42. Associated with the operating cylinder 52 is a shock absorber and spring unit 54 which is included to absorb forces produced by impacts caused by vertical variations between the top of the vehicle supporting track and the guide rail 38.

A typical switching section for merging a double track into a single track is illustrated in FIG. 4 and discloses the track arrangement utilized with the double tread wheel of the vehicle which is also illustrated. It is noticed that all the track sections are permanently attached to the track bed or supporting structure and there are no moving switch parts as generally encountered in conventional switching units. The switch track portion is indicated by the curved tracks which switch a vehicle from the straight tracks.

The straight noncontinuous first track segments 56, 56a and the continuous straight track 57 provide for straight nonswitched movement of the railway vehicle across the switching portion of the track structure. The shorter curved second track segments 58 and 60 and the continuous curved track portion 59 combine to switch the railway vehicle from the straight track portion and in effect steer the train. The track portion 60 forms a continuation of the associated curved switching track 58 to steer the train onto the switch track.

THE OPERATION

The disclosure of the operation will be in reference to the track switching section illustrated in FIG. 4 and the description will proceed describing a vehicle moving from left to right in the illustration. A typical smaller type of passenger vehicle, as designated by the numeral 10, which is riding on the rail members 57 and 59 will be stabilized by the tread angles of the spaced wheel members which tend to center the vehicle between the rails. This stabilized position is illustrated in FIG. 3. As the vehicle 10 proceeds to the right on the tracks illustrated in FIG. 4, the wheels 24 will reach a position wherein they will be positioned between the continuous rail members 57 and 59 and the short rail members 56 and 58 at which point the double rims or double treads of the wheels will be supported by the continuous and non-continuous track sections. Once at this position of maximum support by the rails on the double tread wheels the train is in a position to be switched from the straight track or to continue thereon.

In the event that it should be desirable for the railway vehicle to continue going straight, the guide rail engaging device 42 associated with the track 57 and the continuous rail member 38 and positioned adjacent thereto would be energized, causing the guide rail engaging device to move upward and grab onto the guide rail 38. This energizing of the guide rail engaging device occurs when the wheels are supported on both tread sections by associated rail members. Therefore, it is noticed that if the guide rail engaging device at the top of FIG. 4 adjacent the continuous rail designated by the numeral 57 is energized, the railway vehicle will be guided by a holding force which urges the vehicle to continue going in a straight unswitched direction. It must be pointed out that the necessity for this guide rail being engaged by the device mounted on the truck is to stabilize the railway vehicle which is now being supported by the continuous rail 57 and the non-continuous rail 56. Because of the tread angles on the inner tread of one wheel matching the tread angle of the outer tread on the opposite wheel, the vertical force provided by the weight of the vehicle would tend to cause a derailment. Thus, by having the guide rail engaging device 42 engage an associated guide rail, a stabilizing force is provided which will guide the passenger vehicle in a straight direction and overcome the sliding tendency caused by the wheel tread angles.

Likewise, to perform a switching function the guide rail engaging device 42 at the lower portion of FIG. 4 which is adjacent the tracks 56,59 would be energized when the wheels are in the fully supported position having both treads supported by track portions. It is again pointed out that the necessity for the guide rail engaging device to remain operatively connected with the guide rail during this switching maneuver is that the vehicle is being supported on the track portion 58 and the continuous track 59 in a situation wherein an outer rim is supported on rail 59 and the inner rim of the opposite wheel is supported on the rail portion 58 thus combining with the vertical force or vertical weight of the railway vehicle to provide an unstable condition which would tend to move the vehicle to the top of the illustration and cause a derailment.

The guide rail engaging devices 42 are selectively operable and are to remain operative until the wheels are in the stable supported position having both wheels supported on their outer rims by associated track portions.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A switching apparatus for a transportation vehicle and including:

vehicle supporting track means for providing guided movement to said vehicle and including a main line track portion and a switch track portion merging with the first track portion at a switching junction;

said main line track portion at the switching portion including a continuous straight track portion and laterally spaced and associated noncontinuous straight track portions each having overlapping segments;

said switch track portion at the switching junction also including a continuous curved track portion and laterally spaced and associated noncontinuous curved track portions also having overlapping segments;

vehicle guide rail means mounted adjacent said switching junction and including a first guide rail member adjacent the continuous straight track portion and including a second curved guide rail member adjacent the continuous curved track portion at the switching junction, said first member associated with continued main line movement of said vehicle and said second member associated with switching of the transportation vehicle;

said vehicle having wheel members with double tread portions spaced about a radially disposed rim member and adapted to ride on said vehicle supporting track means;

vehicle mounted steering means having guide rail engaging means positioned on each side of the vehicle and being vertically reciprocable to engage and disengage the associated guide rail means thereby providing selective vehicle steering through said switching junction.

2. The invention according to claim 1, and:

said track means including a sound repressing housing attached below said track means and having side portions extending generally upwardly of the tracks to a level above said wheel members;

said guide rail means having portions attached to the side portions of the housing for mounting the guide rail means upwardly and outwardly of the track means.

3. The invention according to claim 2, and:

said sound repressing housing including a bottom section positioned below said track means and having spaced openings contained therein;

said sound repressing housing also having top flanged portions extending horizontally from the housing side portions and inwardly toward said track means at a height above the vehicle wheel members.

4. The invention according to claim 1, and:

said vehicle having the wheel members arranged in pairs on a connecting axle mounted in a vehicle supporting truck;

said steering means having portions attached to said truck and including connecting means being vertically movable to engage said vehicle guide rail means thereby urging the vehicle in the direction of the engaged guide rail.

5. The invention according to claim 4, and:

said double tread portions of each wheel member including an inner flange and an outer flange;

said noncontinuous straight track portion including a first straight portion adjacent the continuous curved track portions and also having a second track portion including an adjacent portion overlapping a portion of the first straight track portion;

said noncontinuous curved track portions including a first and second curved portions having overlapping sections;

said overlapping portions of both the noncontinuous straight and curved track portions providing a dual wheel support means engaging the double tread portions of the vehicle wheel;

said dual wheel support means providing a transfer means for switching wheel support from one of said double tread portions to the other of said tread portions.

6. The invention according to claim 1, and:

said guide rail means having a downwardly extending portion adapted to connect with the vehicle mounted steering means;

said guide rail engaging means including a pair of roller members positioned to guidingly abut and attach to said downwardly extending portion of the guide rail means.

7. The invention according to claim 6, and:

spring bias means and dampening means adapted to connect the guide rail engaging means with the transportation vehicle, and hydraulic cylinder means operatively coupled with the rail engaging means to provide for selective actuation of the steering means.

\* \* \* \* \*